(12) United States Patent
Zhou et al.

(10) Patent No.: US 10,721,652 B2
(45) Date of Patent: Jul. 21, 2020

(54) ACCESS POINT CONTENTION WINDOW ALTERATION

(71) Applicant: Hewlett Packard Enterprise Development LP, Houston, TX (US)

(72) Inventors: Qiang Zhou, Beijing (CN); Ben Dunsbergen, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 15/580,120

(22) PCT Filed: Oct. 28, 2016

(86) PCT No.: PCT/CN2016/103746
§ 371 (c)(1),
(2) Date: May 3, 2018

(87) PCT Pub. No.: WO2018/076277
PCT Pub. Date: May 3, 2018

(65) Prior Publication Data
US 2020/0022026 A1   Jan. 16, 2020

(51) Int. Cl.
*H04W 28/16*   (2009.01)
*H04W 92/12*   (2009.01)

(52) U.S. Cl.
CPC ............ *H04W 28/16* (2013.01); *H04W 92/12* (2013.01)

(58) Field of Classification Search
CPC .............................. H04W 28/16; H04W 92/12
See application file for complete search history.

(56) References Cited

U.S. PATENT DOCUMENTS

| 2002/0154653 | A1  | 10/2002 | Benveniste |
| 2005/0094558 | A1* | 5/2005  | Lu ......................... H04W 28/08 370/229 |
| 2006/0215686 | A1* | 9/2006  | Takeuchi .............. H04W 28/18 370/445 |
| 2009/0279427 | A1  | 11/2009 | Ji et al. |
| 2015/0139209 | A1* | 5/2015  | Park ...................... H04W 74/08 370/338 |

FOREIGN PATENT DOCUMENTS

| CN | 105359614   | 2/2016 |
| GB | 2433175 A   | 6/2007 |
| WO | WO-2015153605 | 10/2015 |

OTHER PUBLICATIONS

Feng, Bing et al, Design and Analysis of a Prioritized Adaptive Multiple Access Scheme for VoIP over WLANs IEEE Dec. 10, 2015 (Dec. 10, 2015), 6 Pgs.

(Continued)

*Primary Examiner* — Afshawn M Towfighi
(74) *Attorney, Agent, or Firm* — Brooks, Cameron & Huebsch, PLLC

(57) ABSTRACT

Example implementations relate to access point contention window alterations. For example, a system for access point contention window alterations may comprise a processing resource; and a memory resource storing readable instructions to cause the processing resource to: calculate an activity value for a station of a network; and alter a defined contention window of an access point coupled to the station when the activity value is above a threshold activity level.

16 Claims, 3 Drawing Sheets

(56) References Cited

OTHER PUBLICATIONS

Gannoune, Lassaad, A Non-Linear Dynamic Tuning of the Minimum Contention Window (CWmin) for Enhanced Service Differentiation in IEEE 802.11 ad-hoc Networks IEEE May 10, 2006 (May 10, 2006), 1 Pg.

International Searching Authority, The International Search Report and the Written Opinion, dated Jul. 21, 2017, PCT/CN2016/103746, 11 Pgs.

Mahdieh Ghazvini et al: "Game Theory Applications in CSMA Methods", IEEE Communications Surveys and Tutorials, Institute of Electrical and Electronics Engineers, US, Jul. 1, 2013, pp. 1062-1087.

IEEE Standards Association "Part 11: Wireless LAN Medium Access Control (MAC) and Physical Layer (PHY) Specifications" Sponsored by the LAN/MAN Standards Committee, IEEE Standard for Information technology—Telecommunications and information exchange between systems Local and metropolitan area networks—Specific requirements, Mar. 29, 2012, 2793 pages.

European Search Report and Search Opinion Received for EP Application No. 16898876.4, dated May 25, 2018, 25 pages.

\* cited by examiner

ACCESS POINT CONTENTION WINDOW ALTERATION

BACKGROUND

Network operating systems may utilize a networking standard. For example, network operating systems can utilize IEEE 802.11 standard. Networks utilizing network operating systems can allow client devices to connect with access points within the network. In some examples, the network can include a plurality of access points that can each receive communication requests for client devices. Relatively large quantities of client devices can send communication requests to the plurality of access points.

DETAILED DESCRIPTION

Figure 1:
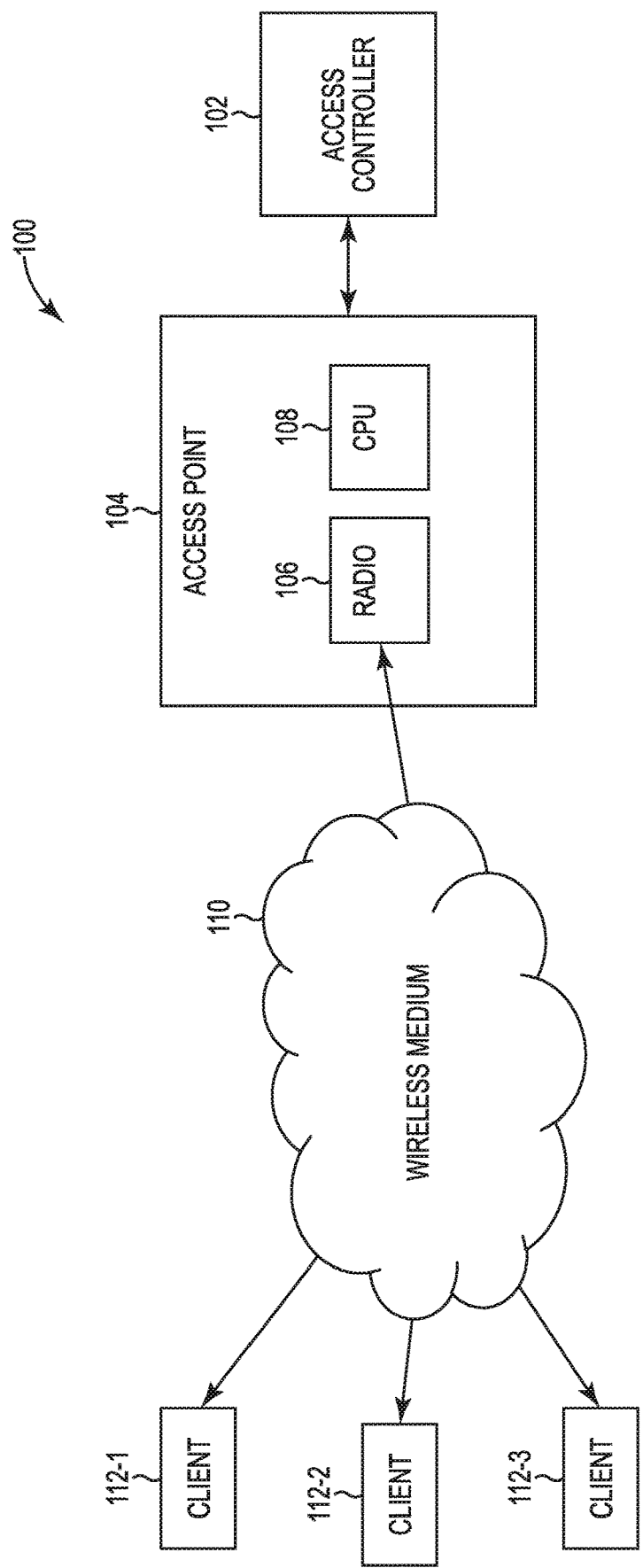
FIG. 1 illustrates an example environment for an access point contention window alteration, in accordance with the present disclosure.

Access point contention window alteration systems and methods can be utilized to calculate an activity value for a station of a network and alter a defined contention window of an access point coupled to the station when the activity value is above a threshold activity level. As used herein, the activity value for a station can be a value that represents whether the station is active or inactive. In some examples, the station can be a network device capable of utilizing a network protocol (e.g., 802.11 protocol, etc.). For example, the station can be an access point or a client device within a network utilized to communicate with other network devices and/or client devices.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. The contention window systems and methods can utilize enhanced distributed channel access (EDCA) protocol to alter and/or tune the contention window for an access point based on an activity value of stations coupled to the access point. In some examples, the EDCA protocol can include a number of priority levels (e.g., access categories such as voice, video, best effort, background, etc.). The contention window systems and methods can calculate the activity value for the station and tune the contention window of an access point coupled to the station via the EDCA protocol.

As used herein the contention window can include a minimum contention window (Cwmin) and/or a maximum contention window (Cwmax) that is utilized to identify a range of values for a backoff timer. For example, the contention window can include a range of values to be selected for a backoff timer when there is a collision of data packets. As used herein, a collision of data packets includes when two or more stations attempt to transmit a packet across an access point or network device at the same time. When this happens, the stations can be assigned a random backoff timer based on the contention window. In this example, the stations wait for their respective backoff timers to end before attempting to retransmit the data packets.

Tuning the contention window can reduce a quantity of collisions between active clients and other access points, which can also protect downstream traffic of the access point. In some examples, tuning the contention window can also balance channel access between the active clients and other access points. In some examples, access point contention window alteration systems and methods can be utilized by access points that provide services to relatively high active client density environments and relatively low active client density environments compared to systems and methods that utilize a static contention window and/or a fixed contention window.

FIG. 1 illustrates an example environment 100 for an access point contention window alteration, in accordance with the present disclosure. In some examples, the environment 100 can be a network such as a local area network (LAN), wide area network (WAN), Internet, among other types of wired and wireless networks. The environment 100 can be a network to exchange data packets or other types of communication between computing devices (e.g., computer, laptop, server, etc.).

In some examples, the environment 100 can include a number of client devices 112-1, 112-2, 112-3. As used herein, client devices can include computing devices that include computing hardware and/or computing instructions to access a service such as a service provided by a computing server. The client devices 112-1, 112-2, 112-3 can be computing devices that are communicatively coupled to a wireless medium 110. As used herein, a wireless medium 110 can include a space between the client devices 112-1, 112-2, 112-3 and an access point 104. In some examples, the wireless medium 110 can include a number of additional access points (not shown) and/or a network to communicatively couple the client devices 112-1, 112-2, 112-3 to the access point 104.

As used herein, an access point 104 can include a wireless access point (WAP) that includes networking hardware to connect to a network. In some examples, the access point 104 can include a radio 106 and/or a computing device 108. In some examples, the radio 106 can be utilized to wirelessly communicate with other network devices. For example, the radio 106 can wirelessly send and/or receive data packets from other network devices. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. In some examples, the radio 106 can also be utilized to receive communication requests from a plurality of devices such as the client devices 112-1, 112-2, 112-3.

The radio 106 can be coupled to a computing device 108 (e.g., central processor unit (CPU), etc.). In some examples, the computing device 108 and/or access controller 102 can be utilized to manage or receive instructions to manage the access point 104. In some examples, the computing device 108 and/or access controller 102 can utilize enhanced distributed channel access (EDCA) protocol for managing traffic associated with the access point 104. For example, the computing device 108 and/or access controller 102 can utilize the EDCA protocol to tune a contention window of access point 104 based on an activity value (e.g., quantity of active clients) associated with the access point 104. As described herein, a contention window of the access point 104 includes a range of values to be randomly assigned to stations (e.g., client devices 112-1, 112-2, 112-3, etc.) as a backoff timer when a collision occurs.

As used herein, a station is a network device such as an access point, radio, client device, and/or computing device that can utilize a protocol. In some examples, the access point 104 can communicate with a plurality of stations. For example, the access point 104 can be communicatively coupled to client devices 112-1, 112-2, 112-3 and other network devices within the wireless medium 110. In some examples, a first portion of the client devices 112-1, 112-2, 112-3 can be active client devices and a second portion of the client devices 112-1, 112-2, 112-3 can be inactive client devices.

In some examples, the computing device 108 and/or access controller 102 can calculate an activity value for the access point 104. In some examples, the activity value can be calculated based on a quantity of data packets received at stations coupled to the access point 104 and/or a quantity of active stations coupled to the access point 104. For example, the computing device 108 can determine a quantity of active clients from the number of client devices 112-1, 112-2, 112-3 coupled to the access point 104.

In some examples, the computing device 108 and/or access controller 102 can calculate an activity for stations coupled to the access point 104 based on a data packet of last second for the stations. As used herein, a data packet of last second for the station includes whether a data packet was received by the station at a previous second or previous time period. For example, the computing device 108 can determine at a time of 2 seconds whether a data packet was received at a time of 1 second at a particular station. In this example, when a data packet was received at the particular station at the time of 1 second, the particular station can be considered active. In this example, when a data packet was not received at the station at the time of 1 second, the station can be considered inactive. In some examples, a data packet of last second can be determined for each of the plurality of stations coupled the access point 104. In some examples, a client can be determined active or inactive by counting downstream traffic of last second for each station and determine if the quantity of downstream traffic exceeds a threshold value.

In some examples, the quantity of active clients and the quantity of inactive clients coupled to the access point 104 can be utilized to calculate an activity value for the access point 104. As used herein, the activity value (e.g., client activity level, etc.) for the access point 104 can be an estimated quantity of active clients coupled to the access point 104. In some examples, the activity value can be an estimated quantity of active clients coupled to the access point 104 for a next second time period (e.g., a future time period, etc.). In some examples, the activity value can be calculated based on the determined quantity active stations at a previous time period (e.g., time period of last second, etc.) with a moving average estimation equation.

In some examples, the calculated activity value can be utilized to tune the contention window of the access point 104. For example, the calculated activity value of the access point 104 can be compared to a number of threshold values to determine a contention window for the access point 104. For example, when the calculated activity value is below a threshold value, the computing device 108 and/or access controller 102 can alter the contention window of the access point 104 to a first contention window value. In this example, when the calculated activity value is above a threshold value, the computing device 108 and/or access controller 102 can alter the contention window of the access point to a second contention window value. In these examples, the first contention window value can be less than the second contention window value.

In some examples, the activity value of the access point 104 can be compared to a plurality of ranges to determine a contention window value for the access point 104. For example, the activity value of the access point 104 can be compared to a chart of activity value ranges. In this example, the computing device 108 and/or access controller 102 can store the chart of activity value ranges and compare the calculated activity value for the access point to the chart. In this example, the chart can also include corresponding contention window values for each of the activity value ranges. Thus, the computing device 108 and/or access controller 102 can determine a contention window value for the access point 104 based on the calculated activity value.

In some examples, the contention window of the access point 104 can be altered utilizing EDCA parameters. In some examples, the number of client devices 112-1, 112-2, 112-3 can be notified of the altered contention window of the access point 104. For example, the computing device 108 and/or access controller 102 can generate a beacon message with the altered contention window of the access point 104. In this example, the radio 106 can be utilized to transmit the generated beacon message to the number of client devices 112-1, 112-2, 112-3.

In some examples, the generated beacon can be a wireless multimedia extension (WME) beacon and/or a Wi-Fi multimedia (WMM) beacon that notifies the client devices 112-1, 112-2, 112-3 and/or other stations coupled to the access point 104 to update their EDCA parameters (e.g., contention window, etc.). In some examples, probe responses can be utilized to update the EDCA parameters of the client devices 112-1, 112-2, 112-3 and/or other stations coupled to access point 104. For example, the altered contention window can be programmed into a WMM beacon and notify the client devices 112-1, 112-2, 112-3 and/or other stations that send a probe request to the access point 104.

Tuning the contention window can reduce a quantity of collisions between active clients and other access points, which can also protect downstream traffic of the access point 104. In some examples, tuning the contention window can also balance channel access between the active clients and other access points. In some examples, access point contention window alteration systems and methods can be utilized by access points that provide services to relatively high active client density environments and relatively low active client density environments compared to systems and methods that utilize a static contention window and/or a fixed contention window.

Figure 2:
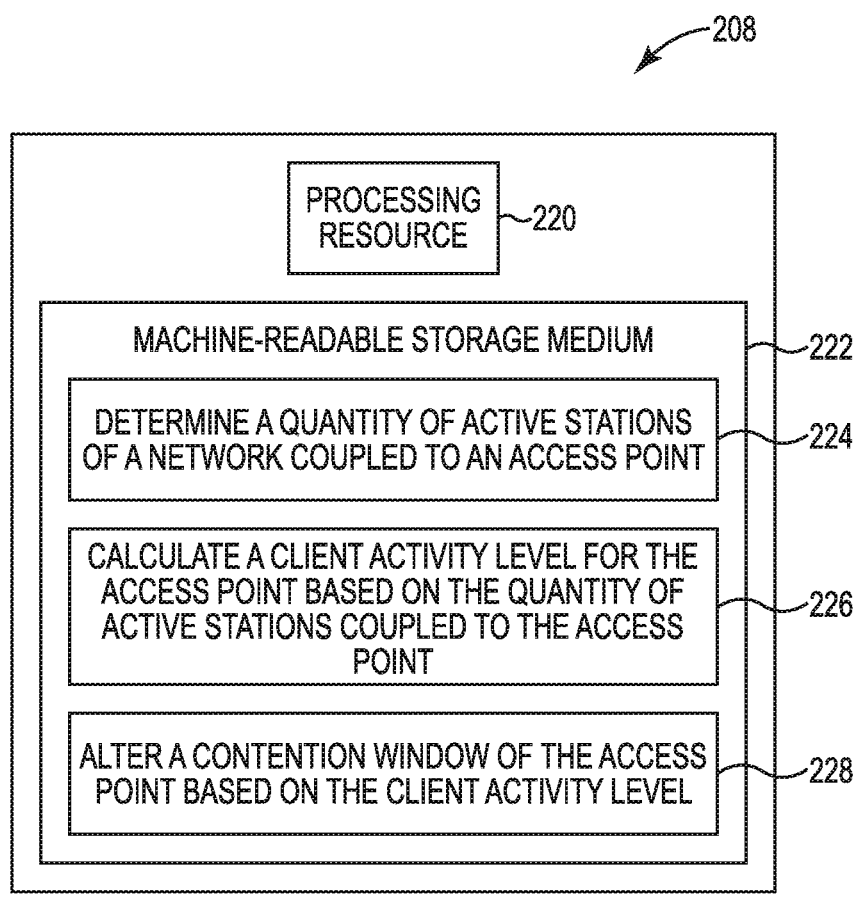
FIG. 2 is a block diagram of an example system for an access point contention window alteration, in accordance with the present disclosure.

FIG. 2 is a block diagram of an example system 208 for an access point contention window alteration, in accordance with the present disclosure. The system 208 may include a computing device that is capable of communicating with a remote system. In the example of FIG. 2, the system 208 includes a processing resource 220 and a memory resource 222. The memory resource 222 may store readable instructions to cause the processing resource 220 to perform a number of operations. Although the following descriptions refer to a single processing resource and a single memory resource, the descriptions may also apply to a system with multiple processing resources and multiple memory resources. In such examples, the instructions may be distributed across multiple memory resources and the instructions may be distributed across multiple processing resources. Put another way, the instructions may be stored across multiple machine-readable storage mediums and executed across multiple processing resources, such as in a distributed computing environment.

Processing resource 220 may be a central processing unit (CPU), microprocessor, and/or other hardware device suitable for retrieval and execution of instructions stored in memory resource 222. In the particular example shown in FIG. 2, processing resource 220 may receive, determine, and send instructions 224, 226, 228. As an alternative or in addition to retrieving and executing instructions, processing resource 220 may include an electronic circuit comprising a number of electronic components for performing the operations of the instructions in the memory resource 222. With respect to the executable instruction representations or boxes described and shown herein, it should be understood that part or all of the executable instructions and/or electronic circuits included within one box may be included in a different box shown in the figures or in a different box not shown.

Memory resource 222 may be any electronic, magnetic, optical, or other physical storage device that stores executable instructions. Thus, memory resource 222 may be, for example, Random Access Memory (RAM), an Electrically-Erasable Programmable Read-Only Memory (EEPROM), a storage drive, an optical disc, and the like. The executable instructions may be stored on the memory resource 222. Memory resource 222 may be a portable, external or remote storage medium, for example, that allows the system to download the instructions from the portable/external/remote storage medium. In this situation, the executable instructions may be part of an "installation package". As described herein, memory resource 222 may be encoded with executable instructions for network authentication system extensions.

The system 208 may also include instructions 224 executable by a processing resource, such as processing resource 220, to determine a quantity of active stations of a network coupled to an access point. As described herein, determining a quantity of active stations can include determining a quantity of packets received by a station during a time period. In some examples, determining the quantity of active stations can include determining if a last second data packet was received by each of the stations. As used herein, a last second data packet is a data packet that was received in a previous second or previous time period as described herein. In some examples, a station that receives a last second data packet can be determined to be an active station and a station that does not receive a last second data packet can be determined to be an inactive station.

In some examples, the system 208 can determine a quantity of active stations coupled to an access point and determine a quantity of inactive stations coupled to the access point based on whether a station received a last second data packet. For example, the system can utilize a moving average method equation to determine a quantity of stations to be active in the next second or future time period and a quantity of stations to be inactive in the next second or future time period. In this example, the system 208 can determine the quantity of active stations for a future time period.

The system 208 may also include instructions 226 executable by a processing resource, such as processing resource 220, to calculate a client activity level for the access point based on the quantity of active stations of the access point. In some examples, the client activity level can be a quantity of active clients coupled to an access point. As described herein, each of a plurality of client devices and/or other stations can be coupled to an access point. The plurality of client devices and/or other stations can be active clients that are attempting to communicate with the access point and inactive clients that are not attempting to communicate with the access point. The system 208 can determine the client activity level based on a predicted quantity of active stations for a future time period.

The system 208 may also include instructions 228 executable by a processing resource, such as processing resource 220, to alter a contention window of the access point based on the client activity level. As described herein, a contention window of the access point includes a range of values to be randomly assigned to stations as a backoff timer when a collision occurs. In some examples, the system 208 can utilize an EDCA parameter to alter the contention window of the access point. In some examples, the system 208 can utilize the EDCA parameter to alter a minimum contention window (Cwmin) of the access point based on the client activity level.

In some examples, the system 208 can alter a maximum contention window (Cwmax) to the altered minimum contention window when the altered minimum contention window is greater than the maximum contention window. For example, the minimum contention window can be altered by the system 208 to a value of 10 based on the client activity level. In this example, when the designated maximum contention window is set to 8, the system 208 can alter the maximum contention window to a value of 10. In some examples, the maximum contention window can be altered with an EDCA parameter similarly to altering the minimum contention window.

In some examples, the system 208 can utilize a chart or table to determine a contention window value based on the client activity level. For example, the system 208 can include a table with a plurality of client activity level values with corresponding contention window values. In some examples, the system 208 can compare the calculated client activity level to the chart to determine the corresponding contention window value. In these examples, the system 208 can determine a current contention window value for the access point and alter the contention window value to the corresponding contention window value when the current contention window value is different than the corresponding contention window value. In some examples, Chart 1 can be utilized the system 208 for determining a contention window for an access point.

CHART 1

| Client Activity Value (Estimated quantity of active clients) | Contention Window (Minimum Contention Window) |
|---|---|
| Client Activity Value < 5 | 4 |
| 5 <= Client Activity Value < 10 | 6 |
| 10 <= Client Activity Value < 20 | 8 |
| 20 <= Client Activity Value | 10 |

The contention window of the access point can be altered utilizing EDCA parameters. In some examples, the number of client devices coupled to the access point can be notified of the altered contention window of the access point by the system 208. For example, the system 208 can generate a beacon message with the altered contention window of the access point. In this example, the system 208 can transmit the generated beacon message to the number of client devices.

In some examples, the generated beacon can be a wireless multimedia extension (WME) beacon and/or a Wi-Fi multimedia (WMM) beacon that notifies the client devices and/or other stations coupled to the access point to update their EDCA parameters (e.g., contention window, etc.). In some examples, probe responses can be utilized to update the EDCA parameters of the client devices and/or other stations coupled to access point. For example, the altered contention window can be programmed into a WMM beacon and notify the client devices and/or other stations that send a probe request to the access point.

Tuning the contention window can reduce a quantity of collisions between active clients and other access points, which can also protect downstream traffic of the access point. In some examples, tuning the contention window can also balance channel access between the active clients and other access points. In some examples, access point contention window alteration systems and methods can be utilized by access points that provide services to relatively high active client density environments and relatively low active client density environments compared to systems and methods that utilize a static contention window and/or a fixed contention window.

Figure 3:
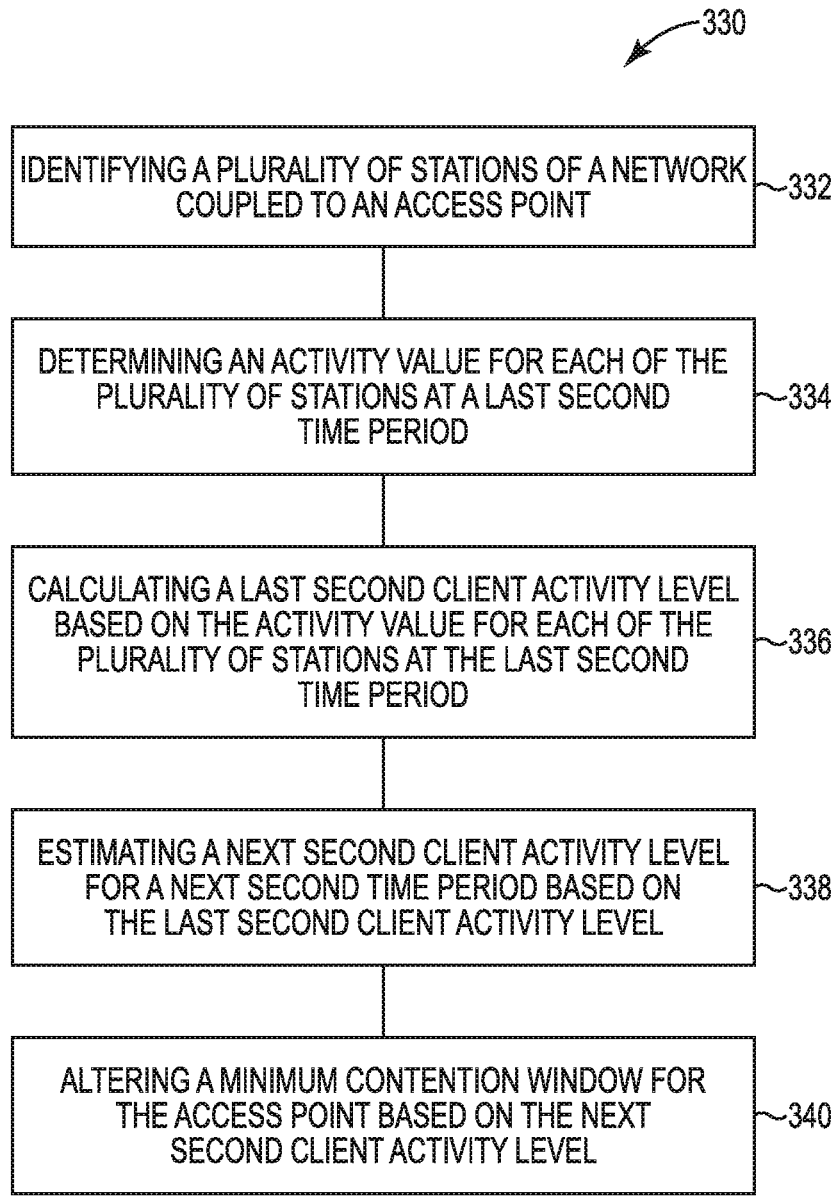
FIG. 3 is a block diagram of an example method for an access point contention window alteration, in accordance with the present disclosure.

FIG. 3 is a block diagram of an example method 330 for an access point contention window alteration, in accordance with the present disclosure. In some examples, the method 330 can be executed or performed by a computing device, such as computing device 108 as referenced in FIG. 1 and/or by a system, such as system 208 as referenced in FIG. 2. In some examples, the method 330 can be utilized to tune a contention window of an access point based on a quantity of active stations coupled to the access point.

At 332, the method 330 can include identifying a plurality of stations of an access point. In some examples, identifying the plurality of stations of an access point can include pinging stations that are coupled to the access point. As described herein, a station can be a network device capable of utilizing a network protocol In some examples, the plurality of stations can include client devices, other access points, and/or other network devices within a network. In some examples, the plurality of stations can include active stations and inactive stations. In some examples, the active stations can include stations that are actively sending data packets to the access point. In some examples, the inactive stations can include stations that are not actively sending data packets to the access point.

In some examples, the access point can include a designated contention window based on the plurality of stations coupled to the access point. As described herein, the designated contention window can be altered based on active stations of the plurality of stations. As described herein, altering the contention window based on active stations instead of total stations can reduce collisions at the access point and/or can reduce collisions down the line of the network.

At 334, the method 330 can include determining an activity value for each of the plurality of stations at a last second time period. In some examples, the activity value can be a 1 when a station is active and a 0 when the station is inactive. As described herein, the activity value for a station can be determined based on whether the station received a last second data packet. As described herein, a last second data packet can be a data packet that was sent or received at a last second time period or a particular time period. In some examples, the activity value for each of the plurality of stations can be utilized to calculate a last second client activity as described herein.

At 336, the method 330 can include calculating a last second client activity level based on the activity value for each of the plurality of stations at the last second time period. For example, the method 330 can include determining if each of the plurality of stations received a data packet during the last second time period. Calculating the last second client activity based on the activity value can include calculating the quantity of active stations of the plurality of stations coupled to the access point. For example, a quantity of stations with an activity value of 1 can be determined. In some examples, the activity values of the plurality of stations can be added to determine the quantity active stations coupled to the access point.

At 338, the method 330 can include estimating a next second client activity level for a next second time period based on the last second client activity level. In some examples, the quantity of active stations determined based on the activity value of the plurality of stations can be utilized to calculate a next second client activity level. As used herein, a next second client activity level can be a predicted client activity level or a predicted client activity value for the plurality of stations coupled to the access point.

In some examples, estimating the next second client activity level can include utilizing a moving average method calculation or a moving average method equation. As used herein, a moving average method calculation includes a calculation that analyzes subsets of the activity values for the plurality of stations. In some examples, the subsets of the activity values for the plurality of stations can be based on averages. In some examples, the moving average method calculation can include utilizing Equation 1.

$$ENAC(t+1) = ENAC(t) + NAC(t) + NAC(t-1) + \ldots + NAC(t-(n-2))/n \quad \text{Equation 1}$$

Equation 1 can be utilized to calculate the next second client activity level (estimated number of active clients (ENAC(t+1))). Equation 1 can include an estimated number of active clients at time t (ENAC(t)). As used herein, the ENAC at time t can be the activity value for the plurality of stations. Equation 1 can also include a number of active clients (NAC) for times (t−1) and a plurality of other times including time (t−(n−2)). In some examples, n can equal a quantity of times where a number of active clients was determined or estimated as described herein.

At 340, the method 330 can include altering a minimum contention window for the access point based on the next second client activity level. As described herein a contention window or a minimum contention window can be altered based on the estimated client activity level or the next second client activity level. In some examples, the minimum contention window can be altered In some examples, the method 330 can include altering a maximum contention window to the altered minimum contention window when the altered minimum contention window is greater than the maximum contention window.

In some examples, the method 330 can include altering the minimum contention window to a corresponding value when the next second client activity is within a corresponding range of values. As described herein, the contention window of the access point can be altered utilizing EDCA parameters. In some examples, the number of client devices coupled to the access point can be notified of the altered contention window of the access point. For example, a beacon message can be generated with the altered contention window of the access point. In this example, the generated beacon message can be transmitted to the number of client devices.

In some examples, the generated beacon can be a wireless multimedia extension (WME) beacon and/or a Wi-Fi multimedia (WMM) beacon that notifies the client devices and/or other stations coupled to the access point to update their EDCA parameters (e.g., contention window, etc.). In some examples, probe responses can be utilized to update the EDCA parameters of the client devices and/or other stations coupled to access point. For example, the altered contention window can be programmed into a WMM beacon and notify the client devices and/or other stations that send a probe request to the access point.

In some examples, the method 330 can include notifying the plurality of stations to update an enhanced distributed channel access (EDCA) traffic category based on the altered minimum contention window in a beacon. As described herein, a WME or WMM beacon message can be sent to the plurality of stations to update the EDCA traffic category of minimum contention window. In some examples, the plurality of stations can be notified to update their EDCA traffic category for interacting with the access point.

Tuning the contention window can reduce a quantity of collisions between active clients and other access points, which can also protect downstream traffic of the access point. In some examples, tuning the contention window can also balance channel access between the active clients and other access points. In some examples, access point contention window alteration systems and methods can be utilized by access points that provide services to relatively high active client density environments and relatively low active client density environments compared to systems and methods that utilize a static contention window and/or a fixed contention window.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A system, comprising:
   a processing resource; and
   a memory resource storing readable instructions to cause the processing resource to:
   determine an activity value for each of a plurality of stations associated with an access point in a network, wherein the determination of the activity value for each station is based on whether the station received a data packet during a certain time period, an activity value for a station indicating whether the station was active or inactive during the certain time period;
   calculate a client activity level for the access point, wherein the calculation of the client activity level is based on the activity value for each of the plurality of stations during the certain time period;
   estimating a future client activity level for the access point based at least in part at least the calculated client value; and
   alter a defined contention window for the access point based at least in part on the estimated future client activity level.

2. The system of claim 1, wherein the activity value for a station is determined at least in part on a quantity of data packets sent to the station over a period of time.

3. The system of claim 1, wherein the client activity level for the access point indicates a proportion of the plurality of stations associated with the access point that are active or inactive during the certain time period.

4. The system of claim 3, wherein the determination of the activity value for a station is based at last in part on a determination that the station is active if a data packet was received by the station during the certain time period and that the station is inactive if a data packet was not received by the station during the certain time period.

5. The system of claim 1, wherein the future client activity level for the access point corresponds to the altered contention window for the access point.

6. The system of claim 1, wherein altering the contention window includes comparing the estimated future client activity level to one or more threshold activity levels or ranges, and altering the contention window based on a result of the comparison.

7. The system of claim 1, wherein estimating the future client activity level in based on a moving average of client activity levels.

8. The system of claim 1, wherein the contention window identifies one or more values for a backoff timer when there is a collision of data packets.

9. A non-transitory machine readable medium including instructions executable by a processing resource to:
   identify a plurality of active stations of a network coupled to an access point;
   determine an activity value for each of the plurality of stations, wherein the determination of the activity value for each station is based on whether the station received a data packet during a certain time period, an activity value for a station indicating whether the station was active or inactive during the certain time period;
   calculate a client activity level for the access point, wherein the calculation of the client activity level is based on the activity value for each of the plurality of stations coupled to the access point during the certain time period;
   estimating a future client activity level for the access point based at least in part at least the calculated client activity; and
   alter a contention window of the access point based at least in part on the estimated future client activity level.

10. The medium of claim 9, wherein the contention window is an enhanced distributed channel access (EDCA) traffic category.

11. The medium of claim 9, wherein active stations include stations that received a data packet during the certain time period and inactive stations include stations that did not receive a data packet during the certain time period.

12. A method, comprising:
   identifying a plurality of stations of a network coupled to an access point;
   determining an activity value for each of the plurality of stations, wherein the determination of the activity value for each station is based on whether the station received a data packet during a certain time period, an activity level for a station indicating whether the station was active or inactive during the certain time period;
   calculating a client activity level for the access point, wherein the calculation of the client activity level is based on the activity value for each of the plurality of stations during the certain time period;
   estimating a future client activity level for a future time period for the access point based at least in part on the calculated client activity level; and
   altering a contention window for the access point based least in part on the estimated future client activity level.

13. The method of claim 12, further comprising altering a maximum contention window to be the altered contention window when the altered contention window is greater than the maximum contention window.

14. The method of claim 12, further comprising altering the contention window to a corresponding value when the estimated future client activity is within a corresponding range of values.

15. The method of claim 12, comprising, notifying the plurality of stations to update an enhanced distributed channel access (EDCA) traffic category based on the altered minimum contention window in a beacon.

16. The method of claim 12, wherein the determination of the activity value for a station is based at last in part on a determination that the station is active if a data packet was received by the station during the certain time period and that the station is inactive if a data packet was not received by the station during the certain time period.

* * * * *